UNITED STATES PATENT OFFICE.

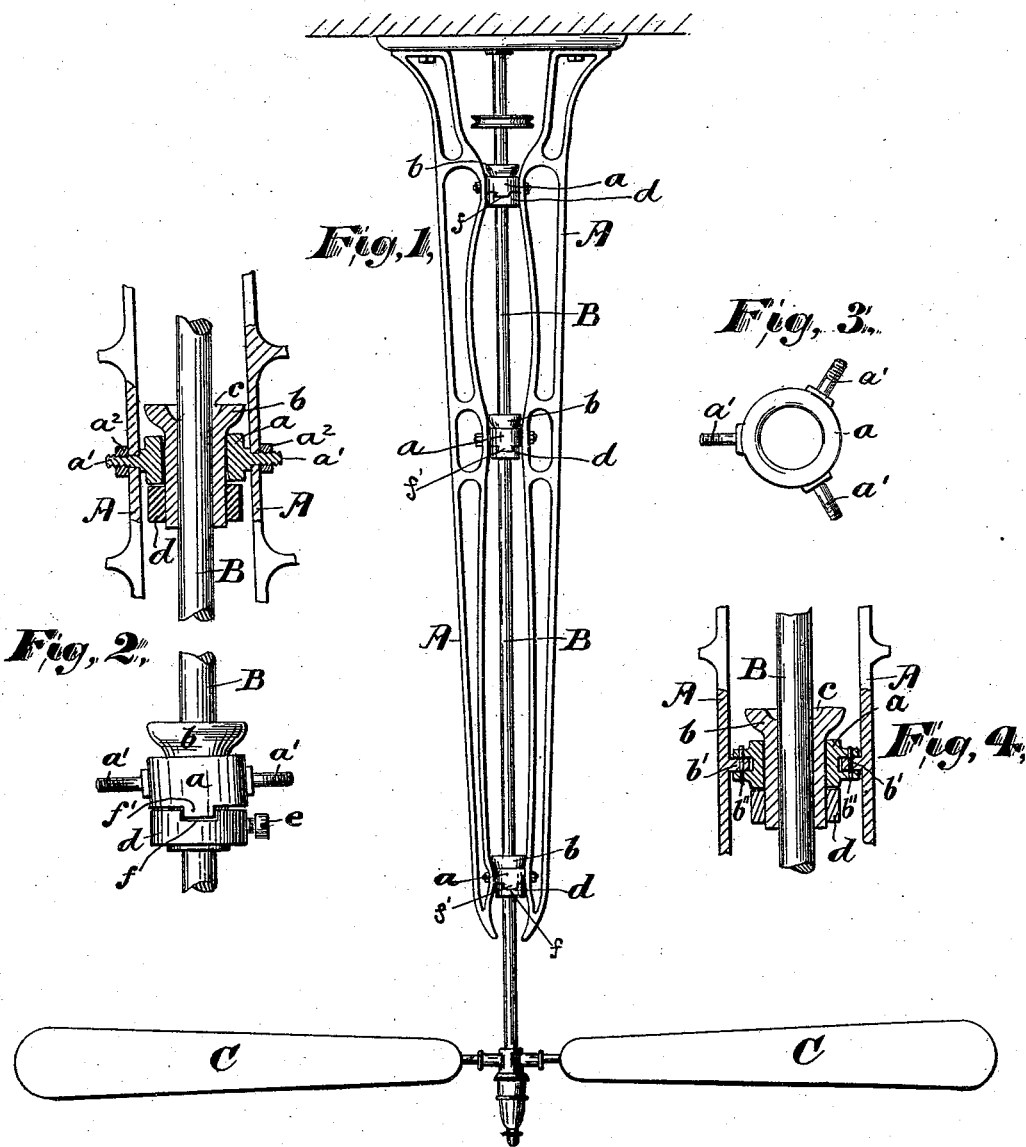

EDWIN F. VAN HOUTEN, OF NEWARK, NEW JERSEY.

SELF-ADJUSTING JOURNAL-BEARING.

SPECIFICATION forming part of Letters Patent No. 537,252, dated April 9, 1895.

Application filed June 1, 1894. Serial No. 513,138. (No model.)

*To all whom it may concern:*

Be it known that I, EDWIN F. VAN HOUTEN, a citizen of the United States, residing at Newark, in the county of Essex and State of New Jersey, have invented certain new and useful Improvements in Self-Adjusting Journal-Bearings; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The primary object of this invention is to provide a bearing for the vertical shaft of a fan which shall be self adjusting and self lubricating, thereby doing away with unnecessary friction and reducing the latter to the minimum.

The invention consists in the improved bearing and in the arrangement and combination of the parts thereof and connected therewith, as herein set forth and finally pointed out in the claims.

Referring to the accompanying drawings, in which similar letters of reference indicate corresponding parts in each of the figures where they occur, Figure 1 represents in elevation a fan suspended from the ceiling of a room and my improved bearing connected with the bracket which carries the shaft. Fig. 2 is a view partly in section and partly in elevation of a broken off portion of said part upon an enlarged scale. Fig. 3 is a plan view of a socket or ring in which the bearing is adjusted, and Fig. 4 is a modification shown in section.

In said drawings, A, designates the bracket; B, the shaft, and C, the blades of an ordinary fan.

In carrying out my invention, I secure two or more rings or sockets, $a$, at suitable distances apart, to the arms of the bracket, as indicated in the drawings. Adjusted in said rings or sockets loosely, are bearings $b$, the upper end of each of which is enlarged and curved upon the outside where it engages with the upper side of its respective ring or socket in such a manner as that the bearings will adjust themselves, automatically, into alignment with the shaft. In the top of each of said bearings is formed a cup-shaped recess $c$, which constitutes a reservoir to receive and hold a lubricant. The lower extremity of each bearing is provided with a collar $d$, which is secured in position by a set-screw $e$. Said collar is provided with a groove, $f$, which registers with a tongue $f'$, upon said ring or socket to prevent said bearing from turning in said socket, as will be understood. Said bearing is preferably composed of cast iron with a Babbit metal lining in the usual manner and is therefore not shown, but it may be composed of bronze or cast iron and Babbit metal. Said ring or socket, is provided with screw threaded projections, $a'$, adapted to pass through corresponding apertures in the arms of the bracket and be secured therein by means of nuts, $a^2$, or projections $b'$, may be cast upon the arms of the bracket to engage in recesses in the ring or socket and be secured therein by pins $b''$, as indicated in Fig. 4. Said rings or sockets, however, may be secured in position in any other appropriate manner. In each construction, however, the bearing is prevented from turning within the ring or socket by providing its lower end with a collar $d$ which may be secured thereto by means of a set screw, as shown in Fig. 2.

It will be seen from the foregoing, that the bearings work in the rings or sockets upon the principle of a ball and socket joint. Said collar also prevents any undue vertical movement of the bearings, as will be evident.

By this improvement, the bearings will, as already stated, adjust themselves, automatically, into alignment with the shaft notwithstanding any ordinary unevenness of the ceiling to which the brackets may be secured, as will be evident.

I do not intend to limit the improvement to fans, as it may be and is applicable to other purposes and uses, as will be obvious.

Having thus described my invention, what I claim as new, and wish to secure by Letters Patent of the United States, is—

1. In a self-adjusting journal bearing, the combination, with a bracket, of rings or sockets secured thereto, each having a tongue upon its lower surface, a bearing fitting loosely within each socket, the upper end of which is enlarged or cup-shaped inside and outside, and the lower end of which extends beyond the socket, and a collar secured to the projecting end of the bearing, the upper surface of which is provided with a groove for the reception of the tongue upon the socket, substantially as set forth.

2. In a self-adjusting journal bearing, the combination, with a bracket, of rings or sockets secured thereto, each ring or socket being provided with a screw threaded projection, a nut upon the outer end of the projection, a bearing fitting loosely through each socket, the upper end of which is cup-shaped and the lower end of which projects beyond the socket, and means upon the projecting end of the bearing to retain it in the socket, substantially as set forth.

In testimony that I claim the foregoing I have hereunto set my hand this 21st day of May, 1894.

EDWIN F. VAN HOUTEN.

Witnesses:
   OLIVER DRAKE,
   H. W. TRAGESER.